(12) United States Patent
Capeau et al.

(10) Patent No.: US 9,908,802 B2
(45) Date of Patent: Mar. 6, 2018

(54) METHOD AND DEVICE FOR TREATING AN ORGANIC EFFLUENT

(71) Applicant: OREGE, Toussus le Noble (FR)

(72) Inventors: Patrice Capeau, Marseilles (FR); Pascal Gendrot, Jouy En Josas (FR)

(73) Assignee: OREGE, Toussus le Noble (FR)

( * ) Notice: Subject to any disclaimer, the term of this patent is extended or adjusted under 35 U.S.C. 154(b) by 85 days.

(21) Appl. No.: 15/039,832

(22) PCT Filed: Nov. 27, 2014

(86) PCT No.: PCT/FR2014/053066
§ 371 (c)(1),
(2) Date: May 26, 2016

(87) PCT Pub. No.: WO2015/079177
PCT Pub. Date: Jun. 4, 2015

(65) Prior Publication Data
US 2016/0376182 A1    Dec. 29, 2016

(30) Foreign Application Priority Data
Nov. 27, 2013   (FR) ...................................... 13 61696

(51) Int. Cl.
*C02F 1/20*   (2006.01)
*C02F 1/52*   (2006.01)
(Continued)

(52) U.S. Cl.
CPC .......... *C02F 11/14* (2013.01); *B01D 21/0084* (2013.01); *B01D 21/08* (2013.01);
(Continued)

(58) Field of Classification Search
CPC .... C02F 11/14; C02F 1/20; C02F 1/24; C02F 1/5281; C02F 1/56; C02F 1/74;
(Continued)

(56) References Cited

U.S. PATENT DOCUMENTS

| | | | | |
|---|---|---|---|---|
| 4,415,452 A | * | 11/1983 | Heil ....................... | C02F 1/385 210/195.3 |
| 2008/0047903 A1 | | 2/2008 | Morse | |
| 2013/0227997 A1 | * | 9/2013 | Capeau .................. | B01D 21/01 71/12 |

FOREIGN PATENT DOCUMENTS

FR    2 966 818 A1    5/2012

OTHER PUBLICATIONS

International Search Report dated Feb. 19, 2015, issued in corresponding International Application No. PCT/FR2014/053066, filed Nov. 27, 2014, 5 pages.

(Continued)

*Primary Examiner* — Thomas M Lithgow
(74) *Attorney, Agent, or Firm* — Christensen O'Connor Johnson Kindness PLLC

(57) ABSTRACT

Treating an organic effluent is disclosed. The effluent is fed in a continuous flow at a rate q via a first chamber maintained at a first pressure and/or directly through a first narrowing to a second chamber or container maintained at a second medium pressure by the injection of air into the second chamber at a rate Q in order to obtain an emulsion in the second chamber. A head loss is generated in the emulsion optionally modified by a second and/or third narrowing or a feed valve for a third chamber maintained at a third pressure in the region immediately downstream of the second or third narrowing and/or valve. A flocculant is injected into the region of the third chamber. The emulsion at atmospheric pressure then being degasified and the emulsion thus degasified being recovered in a filtration or decanting device.

15 Claims, 2 Drawing Sheets

(51) Int. Cl.
*C02F 11/14* (2006.01)
*C02F 1/24* (2006.01)
*C02F 1/56* (2006.01)
*C02F 1/74* (2006.01)
*C02F 11/12* (2006.01)
*B01D 21/00* (2006.01)
*B01D 21/08* (2006.01)
*B01D 21/30* (2006.01)

(52) U.S. Cl.
CPC .............. *B01D 21/302* (2013.01); *C02F 1/20* (2013.01); *C02F 1/24* (2013.01); *C02F 1/5281* (2013.01); *C02F 1/56* (2013.01); *C02F 1/74* (2013.01); *C02F 11/121* (2013.01); *C02F 2209/38* (2013.01); *C02F 2209/40* (2013.01); *C02F 2301/066* (2013.01); *C02F 2303/02* (2013.01); *Y02W 10/37* (2015.05)

(58) Field of Classification Search
CPC ................ C02F 11/121; C02F 2209/38; C02F 2209/40; C02F 2301/066; C02F 2303/02; B01D 21/0084; B01D 21/08; B01D 21/302; Y02W 10/37
See application file for complete search history.

(56) References Cited

OTHER PUBLICATIONS

Written Opinion dated Feb. 19, 2015, issued in corresponding International Application No. PCT/FR2014/053066, filed Nov. 27, 2014, 10 pages.
International Preliminary Report on Patentability dated Mar. 23, 2016, issued in corresponding International Application No. PCT/FR2014/053066, filed Nov. 27, 2014, 7 pages.

* cited by examiner

METHOD AND DEVICE FOR TREATING AN ORGANIC EFFLUENT

The present invention relates to a process for the treatment of an organic effluent and more particularly for the treatment, conditioning, coagulation, flocculation and oxidation of emulsions, of highly colloidal aqueous bodies and/or of liquid sludges by bursting, dispersion and diffusion of these inside a pressurized gas.

It also relates to a device for the treatment (conditioning, coagulation, flocculation and oxygenation) of emulsions, of highly colloidal aqueous bodies and/or of liquid sludges employing such a process.

The invention finds a particularly important although not exclusive application in the field of the reduction in volume of organic or biological sludges for the purpose of their treatment or of subsequent use.

Processes for separation between suspended solid matter and the liquid effluent in which the solid matter is found are already known.

The techniques which exist for the extraction of water from sludges are essentially compaction, which increases the content (% by weight of the total mixture) of solid compound by the order of 5%, centrifuging or filtration, which both increase the content of solid compound by 18 to 25%, and finally drying (by combustion or spreading for several weeks), which increases the content of solid compound by 90 to 95%, this being the case while knowing that the content by weight of solid compound of sewage sludges before treatment is generally between 0.1% and 1% of the total weight of the effluent.

All these known treatments of the prior art exhibit disadvantages, either related to the fact that the desiccation is not sufficient (compaction, centrifuging, filtration) or related to the treatment time (drying) or to the high energy consumption (combustion).

A process is already known (FR 2 175 897) for the treatment of slurry waste where a leaktight circuit comprising a vessel is fed, within which circuit recirculation is carried out for several tens of minutes by introducing an oxygen-comprising gas into the circuit upstream of the vessel.

The retention of the activated sludge in the vessel for a period of time sufficient to make possible the supersaturation by the oxygen-comprising gas is indicated as making possible the removal in a significant way of the suspended solids.

Such a process, apart from the fact that it is lengthy, employs a fairly complicated device which is a source of numerous blockages.

A process for the impact decolloidization of at least two streams opposite each other in a small chamber, into which air is bubbled, is also known.

Although fairly effective, this process is essentially applicable to highly inorganic sludges (that is to say, exhibiting a % of organic matter with regard to 100% by weight of dry matter of less than from 5 to 15%).

A process is also known (FR 2 966 818) for separation between liquid and suspended matter of a sludge, in which sludge and air at a large flow rate are injected into a chamber small in volume.

The process makes possible the separation of the water bonded to the organic colloids.

However, such a process does not make it possible to remove some components which contaminate organic sludges, for example sludges laden with ammonia.

The draining of the sludges obtained with such a treatment can furthermore be improved, a gain would only be one % in dryness with respect to the prior art resulting in significant savings in transportation and in disposal cost.

Thus, for sludge treatment plant users, the return on investment in operating costs very quickly justifies a small improvement.

The present invention is targeted at providing a process and a device corresponding better than those previously known to practical requirements, in particular in that the invention will make possible improved dewatering, in particular when it is employed in combination with known centrifuging or pressing/filtration techniques, this being the case for making possible better decontamination of the sludges in particular laden with ammonia, in a very rapid way, the use of the process according to the invention requiring only a few seconds or minutes before a result is obtained.

In particular, this process makes it possible to obtain excellent results for highly organic sludges, that is to say sludges essentially laden with phospholipids, polysaccharides, bacterial residues, volatile fatty acids, and the like.

It is also possible to obtain an optimized output when it is combined with an additional separation appliance positioned downstream of the device (belt filter or centrifuging), improving the desiccation by more than 10%, for example 25%.

With the invention, the existing installations can be easily improved, this being achieved at a low cost as a result of a low electrical consumption and of the use, reasonable in amount, of the utilities employed (compressed air, reactant, and the like).

Furthermore, the process uses a simple device, the continuous operation of which presents few operating restrictions, in contrast to the devices of the prior art, such as centrifuges, for example.

The invention also makes it possible to obtain a solid residue, in the form of a dewatered porous cake, devoid of odour or with an odour of humus, which is particularly easy to reuse and/or to spread.

With this aim, the invention provides in particular a process for the treatment of an effluent, in which the said effluent is fed as a continuous stream at a flow rate $q$ ($m^3/h$), to a chamber or container maintained at a predetermined mean pressure by injecting air into the said chamber at a flow rate $Q$ ($Sm^3/h$), in order to obtain an emulsion in the said chamber, and a pressure drop is created before recovery of the emulsion in a device for filtration or for separation by settling, characterized in that the sludge being organic sludge, the chamber or container termed second chamber is fed with effluent via a first chamber maintained at a predetermined first pressure ($P_1$) and/or directly, and in that the predetermined pressure drop is created in the emulsion by at least one restriction or one valve for feeding a third chamber maintained at a predetermined third pressure in the region located immediately downstream of the said restriction and/or valve, and a flocculant is injected into the said region of the third chamber in order to form at the outlet of the treatment an emulsion of air in the thickened flocculated sludge, then the said emulsion is degassed to atmospheric pressure before discharging.

Advantageously, the chamber or container is fed with effluent through a restriction, the predetermined pressure drop in the emulsion being created by a second and/or a third restriction. The number of restrictions can also be further increased.

One or more pressure/negative pressure sequences are thus carried out, which surprisingly create a state of the matter (emulsion) that makes it possible to in the end obtain a greater gain in dryness.

What is sought here is not porosity but extraction of the water, by adjusting the interactive and/or iterative pressure/negative pressure gradient.

More specifically, the pressure parameter is used to work the organic sludge at the level of its colloid bonds, the input of energy being brought by the pressure in particular at the location of the members creating a pressure drop, by allowing one or more quite strong local excess pressures.

Thus, by exerting a first pressure, a strong stress is produced on the sludge. Since said sludge is a colloidal structure made of organic matter and water, this pressure brings an energy capable of destabilizing/breaking the electrostatic bonds (Coulomb type) or dipolar bonds (van der Waals type). As a result, it causes the water to exit the organic fractions.

The following negative pressure will, for its part, produce a sludge acceleration movement and expansion/drawing toward the region of lower pressure, continuing the colloid destabilization/destruction effect and a bond-breaking effect.

Finally, once again, a sequence of compression and then negative pressure is carried out in order to prolong/amplify/produce the effects stated above.

Sequence after sequence, a different state of the matter (emulsion) is thus created, making it possible to achieve the expected effect.

This can be further improved each time, by adding a new additional pressure/negative pressure sequence.

The flocculation is, for its part and simply, a materialization of the phase separation.

Mean pressure is understood to mean a mean pressure over the volume of the chamber.

It is furthermore noted that the injection of air into the current of the effluent itself introduced with a restriction resulting in a pressure drop creates intense suction of the air as the stream passes.

In the main part of the device, the emulsion is sludge (dispersed phase) in the air (continuous phase) which coats it.

The emulsion of the sludge in air is therefore the result of the pressure/negative pressure actions due to the successive restrictions as claimed.

It is recalled moreover that the value of gas flow rates is conventionally given in $Nm^3/h$ (normal cubic meters/h), the volume (in $Sm^3/h$) being in this case considered at its value related to a pressure of 1 bar, a temperature of 20° C. and 0% humidity as is naturally accepted and understood by a person skilled in the art, who is an engineer in the field of chemical engineering.

In the presence of even a slight negative pressure, a very good dispersion of the sludge in the gas-operated bed is indeed observed, it being known that, on passing through the restriction regions, the pressure is locally strong and can result in an inversion of the proportions.

In these regions, the pressure rises and the air penetrates the sludge better, probably for this reason accentuating the exceptional porosity effect observed with the invention.

By virtue of these phenomena of emulsion and/or of inversion of emulsions, the air comes intimately in contact with the sludge, the flocculation setting the air/water pair in a way favourable to the deodourization, the flotation of the sludge flakes and their dewatering.

It has thus been possible to observe a high porosity of the sludge flakes with millimeter-sized bubbles (from 1 to 5 mm), whereas, during a conventional flotation, micrometer-sized bubbles are created and act as surfactant medium of the organic matter.

In these known cases, the matter rises to the surface at a rate of a few meters per h, leading the bubbles to burst at the surface of the float or possibly allowing the flakes to fall back into the middle region and then into the bottom of the vessel, the sludge having a slightly greater density than water.

With the invention, the flakes have themselves a considerably lower density than that of water (density of the sludge from 0.6 to 0.9 $g/cm^3$).

This highly specific characteristic allows the sludge a high floating quality, produced with an improved rate which renders permanent the separation of phases.

According to one embodiment, means which make it possible to introduce shocks/dispersion into the gas-operated fluidized bed are provided. For example, each chamber is embellished with simple hydraulic systems, such as walls perpendicular to the stream, systems of springs, Raschig rings, and the like.

Advantageously, the effluent is introduced into a chamber (first or second chamber) which is small in size, for example corresponding to a volume≤0.5% of the volume of effluent passed per hour (flow rate), i.e. 50 l per 10 $m^3/h$ of sludge, for example 30 l, indeed even less than or equal to 5 l. This makes possible a sudden pressure drop in the stream of sludge, for example supplied by pumps with a water pressure of 10 bar.

This first chamber (or the second chamber) is, for example, closed by a reduced outlet forming a venturi, making it possible to maintain it at an excess pressure≥4 bar absolute, for example 5 bar absolute.

The outlet of the first chamber is thus produced by a first and/or a second restriction, favourable to the penetration of the air into the effluent, injected downstream of the restriction, for example at 10 $Sm^3/h$ in the second chamber.

A second restriction, at the top of a third chamber, and/or a third restriction, at the top of a fourth chamber, are, for example, provided more or less immediately downstream of this first restriction.

According to the embodiment of the invention more particularly described here and more or less immediately downstream of this second restriction (a few centimeters, 1 m or a few meters), there is furthermore injected a flocculant which makes it possible to trap micro- and millimeter-sized bubbles in contact with the suspended matter.

A highly advantageous phenomenon of immediate flotation of the sludges is then produced, with an upward rate of 50 m/h, indeed even 100 and more m/h. In comparison, the conventional techniques for the flotation of sludges make possible an upward rate of 2 to 6 m/h.

This unexpected phenomenon makes it possible to form a self-draining material from colloidal sludge.

In advantageous embodiments, recourse is in addition and/or furthermore had to one and/or other of the following arrangements:

- the first chamber has a volume of less than 3200 $cm^3$, indeed even less than 30 l, the first pressure being between 4 and 10 bar absolute, the flow rate q being between 5 $m^3/h$ and 30 $m^3/h$, the second pressure being between 1.2 bar and 4 bar absolute, the air flow rate Q being between 5 Sm³/h and 200 Sm³/h, and the third pressure being between 1.05 bar and 2 bar absolute;

an intermediate chamber between the second and third chambers is fed with emulsion;

air is a second time injected downstream of the first injection into the said intermediate chamber, located between the second and the third chambers, at a flow rate Q' for example between 50 and 200 Sm³/h, indeed even more (i.e. >200 Sm³/h, for example 500 Sm³/h or 1000 Sm³/h);

the first, second and/or third restrictions are formed by venturis;

the second chamber is a column with a mean diameter d and with a height H≥10 d, for example a column>2 m, for example 3 m, for example 5 m;

the flocculant is a polymer injected on immediately exiting (a few centimeters, for example between 5 cm and 10 cm) the second or third restriction;

a portion of the flocculated emulsion is recycled in the first chamber, for example as ⅒th and ⅕th of the flow rate or between 5% and 30% of the volume of sludge which has exited from the device, for example 10% or 20%. This makes it possible to lower the overall consumption of polymer;

a treatment of the sludges is carried out downstream of the tubular chamber by centrifuging, filtration and/or pressing;

the air injected can be heated.

The invention also provides a device employing the process as described above.

It also relates to a device for the continuous treatment of a sludge, comprising means for feeding with the said sludge as a continuous stream at a flow rate q, of a chamber or container maintained at a predetermined mean pressure, means for injecting air into the said chamber at a flow rate Q, in order to obtain an emulsion in the said chamber, a restriction or valve arranged in order to create a predetermined pressure drop in the emulsion and means for recovering the thus degassed emulsion in a device for filtration or for separation by settling, characterized in that, the chamber or container being termed second chamber, and the device being arranged in order to treat organic sludge, the means for feeding the said second chamber are arranged in order to feed it, via a first chamber maintained at a predetermined first pressure and/or directly, and in that the device additionally comprises at least one restriction or one valve arranged in order to create a predetermined pressure drop in the emulsion and a third chamber maintained at a predetermined third pressure in the region located immediately downstream of the said restriction and means for injecting a flocculant into the said region of the third chamber and means for degassing the said emulsion to atmospheric pressure.

Advantageously, the feeding means comprise a first restriction upstream of the second chamber, the predetermined pressure drop in the emulsion being created by a second and/or third restriction.

In an advantageous embodiment, the degassing means are located at the other end of the third chamber relative to the region located immediately downstream of the said restriction.

Advantageously, it furthermore comprises an intermediate chamber between the second and third chambers and means for injecting air downstream of the first injection into the said intermediate chamber.

Also advantageously, the first and second restrictions are formed by venturis.

In another advantageous embodiment, the second chamber is a column with a mean diameter d and with a height H≥10 d.

In an alternative form, it is possible to add a reactant which improves the impacts between the sludge particles. It can, for example, be used at a level of 10%, 5% or 1% of the SM content of the sludges.

This reactant is, for example, sand, calcium carbonate, slaked lime, and the like. It is introduced upstream of the column, for example within a vessel for mixing with the liquid sludge (not represented).

Oxygenation reactants can also be introduced.

A better understanding of the invention will be obtained on reading the description which follows of embodiments given below as nonlimiting examples. The description refers to the drawings which accompany it, in which.

Figure 1:
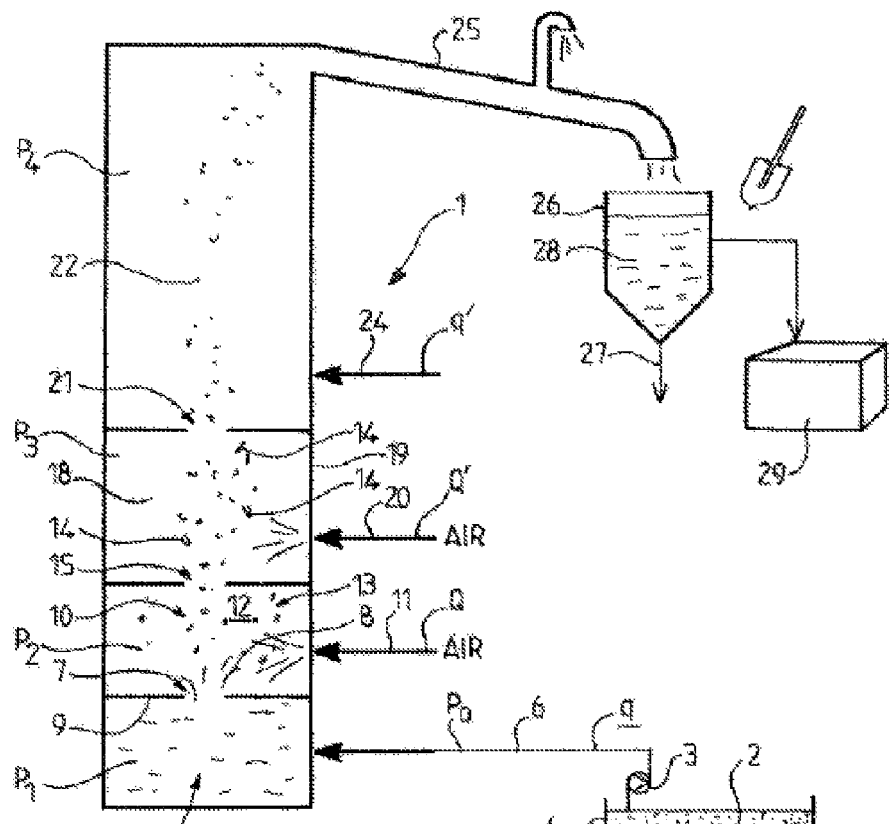
FIG. 1 is a schematic diagram of a device according to the embodiment of the invention more particularly described here.

FIG. 1 diagrammatically shows a device 1 for thickening sludge 2 sucked up by means 3 (pump) from a storage reservoir or basin 4.

The device 1 comprises a first chamber 5 small in volume, for example cylindrical or cubic, for example with a volume of 10 l, for receiving the liquid sludge, for example at a predetermined first pressure $P_1$ slightly below the outlet pressure $P_0$ of the feed pump 3, as a result of the pressure drops of the feed circuit 6 (flexible tube, for example). The flow rate q of the pump is, for example, between 5 m³/h and 50 m³/h, for example 10 m³/h, and the predetermined first pressure $P_1$ is 2 bar absolute, $P_0$ being, for example, 2.2 bar absolute.

The chamber 5 comprises, at its outlet, a round restriction 7, for example formed by an orifice or nozzle 8, for example with a diameter of 2 cm, in an intermediate wall 9, for separation from a second chamber 10 which is larger in volume, for example 200 l.

The second chamber 10, for example cylindrical, is at a second pressure $P_2$ (for example, 1.8 bar absolute) and is fed, for example in the bottom part, with air 11 at a very high flow rate Q=500 Sm³/h and a pressure of several bar, for example 5 bar, creating, in the compartment 12 formed by the chamber, an emulsion 13 of sludge droplets 14 which is discharged via a second restriction 15 similar or identical to the restriction 7.

The injection of air into the emulsion immediately after the introduction of the sludge into the compartment facilitates the mixing which takes place in the part in acceleration after the nozzle (air ejector effect).

The second restriction 15 emerges on an intermediate chamber 18, for example greater in volume, for example 500 l, formed by a cylinder 19, the interior of which is at a third pressure $P_3$, for example of 1.6 bar absolute.

A second injection of air 20 at the bottom part of this intermediate chamber further increases the dividing up or dilution of the sludge in the air, the injection taking place, for example, at a flow rate Q' of 200 Sm³/h, with, for example, 50 Sm³/h<Q'≤Q.

For its part and in the embodiment described here, the intermediate chamber 18 feeds, via a third restriction or nozzle 21, a third chamber 22, also cylindrical, for example with a height of 3 m, at a fourth pressure $P_4$ decreasing from the inlet of the chamber at 23, at 1.2 bar, down to atmospheric pressure in the top part.

The fourth chamber comprises a feed of flocculant 24 (for example, a known polymer) at a flow rate q', for example a function of the type and flow rate of sludge, which can be estimated by a person skilled in the art in a way known per se in order to obtain good flocculation.

The sludges are subsequently discharged, for example by gravity, via a vented manifold 25 into a big bag 26, the purified water 27 being discharged downwards and the thickened sludge for its part being recovered, for example by shoveling, in order to form thickened blocks 29, for example thickened by a factor of 20 with respect to the liquid sludge 2 at the inlet (τ of SM multiplied by 20 before draining in the big bag).

Figure 2:
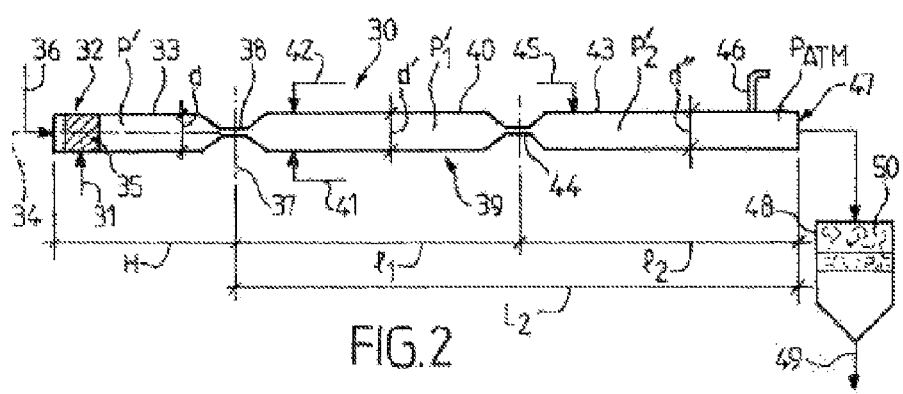
FIG. 2 is an embodiment of another device according to the invention.

FIG. 2 shows another embodiment of a device 30 for the treatment of liquid sludges 31 introduced at an end portion 32 of a container 33 elongated around an axis 34 and with a predetermined height H, for example 1 m.

The container is maintained at a mean pressure P', for example of 2 bar absolute, and is formed by a cylinder with a diameter $\underline{d}$, for example of 150 mm.

The sludge feeds, for example by restriction, via a reduced region 35, for example of 10 l, located at the end portion 32 also fed, at the end of the container and upstream of the introduction of the sludge, with an input of air 36, for example at a pressure P''>P', for example 2.5 bar absolute.

The air is fed at a very high flow rate Q', for example 100 Sm$^3$/h, the sludge for its part being introduced at a flow rate Q, for example 10 m$^3$/h.

The sludge 31 bursts in the air, which is under excess pressure, a slight negative pressure ΔP existing between the container at the inlet of the sludge at 35 and the outlet of the sludge emulsion downstream 37 of the container.

There exists, by the outlet of the container 33, a venturi 38 and/or a control valve which generates a pressure drop, for example 0.4 bar, the sludge emulsion being here discharged into a tubular chamber 39 comprising a first cylindrical part 40 of diameter d' (for example, d'=$\underline{d}$) which is at a pressure P'$_1$<P', for example here 1.6 bar (in the example taken), into which can be injected, downstream of the venturi and close to the latter (for example at 10 cm, in order to make possible good mixing), a reactant at 41 and/or again air (branch connection 42).

In this embodiment, the tubular chamber also comprises a second cylindrical part 43 separated from the first part 40 by a second venturi 44, the said second part having a diameter d" with, for example, d'=d"=d.

A feed 45 of flocculant, with means known per se (metering pump and the like), is provided downstream of the venturi 44 and close to the latter (1 to 10 cm), as well as a vent 46 for bringing to atmospheric pressure and/or a slurry outlet 47 open to the atmosphere, the pressure P'$_2$ in this second part thus being very rapidly brought to atmospheric pressure, for example from 1.3 bar at the outlet of the venturi to rapidly change to 1 bar=1 atmosphere at the outlet 47, the emulsion becoming, after the addition of the flocculant, an emulsion of air in the sludge flakes which flows by gravity over the end.

The total length of the chamber L$_2$≈l$_1$+l$_2$ is, for example 10 m, with l$_1$=3 m and l$_2$=7 m, but other values are possible, the proportion between l$_1$ and l$_2$ generally but not limitingly being such that l$_1$<l$_2$.

The device 30 furthermore comprises a filter 48 and/or a settling tank for discharge of the purified water 49 in the bottom part and of the dehydrated sludge 50 in the top part.

Figure 3:
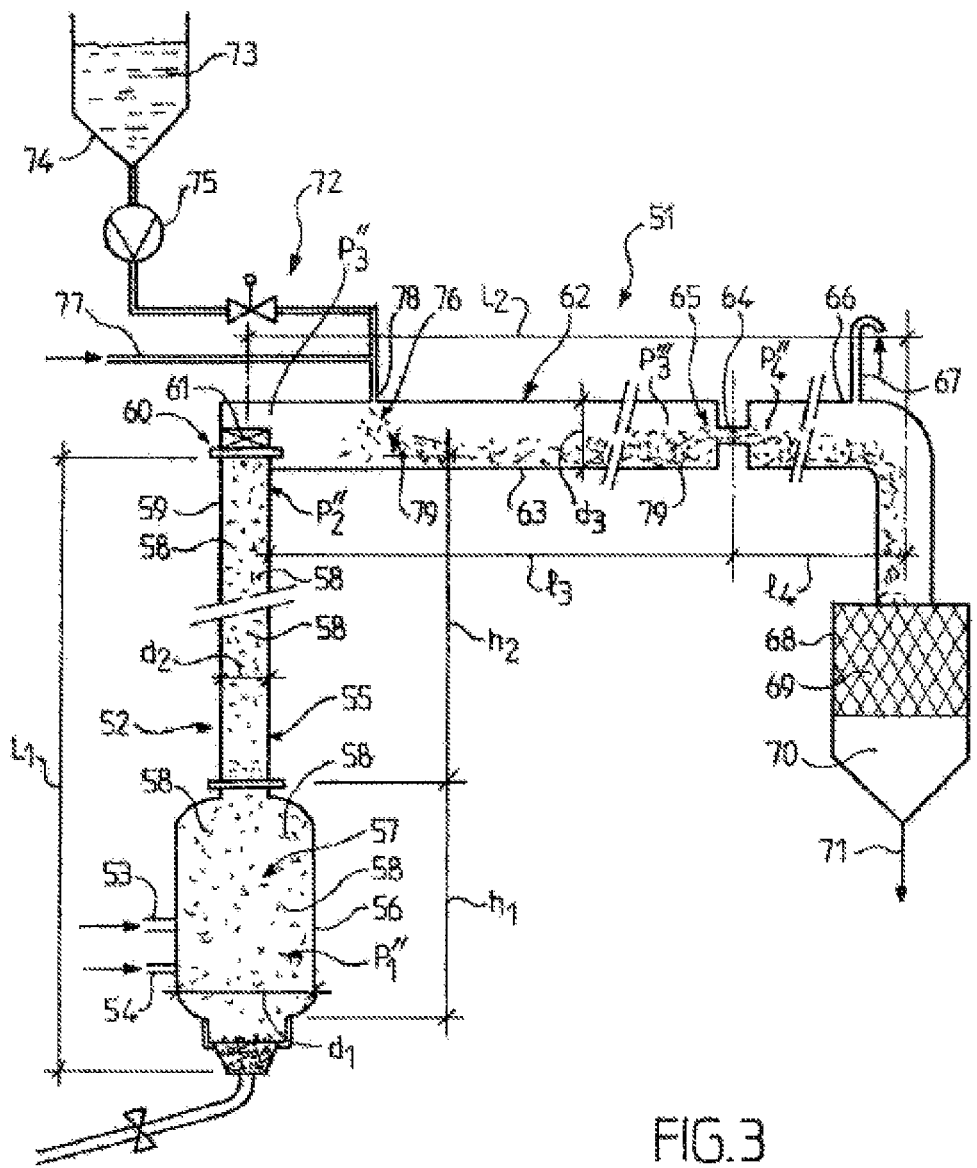
FIG. 3 shows another embodiment of a device according to the invention.

A third embodiment of a device 51 according to the invention has been represented in FIG. 3.

The device 51 comprises a container 52 fed, via a branch connection 53 in the bottom part, thus forming a restriction, for example, with liquid sludge and fed, for example below (but this may also be above or at the same level as) this branch connection 53, with compressed air at a high flow rate via a second branch connection 54.

More specifically, the container is formed by a vertical column 55 comprising a first part forming a tank 56 for very intensively blending/mixing the air and the sludge, having small dimensions, for example cylindrical with a height h$_1$=50 cm and with a diameter $\underline{d_1}$ of 30 cm, i.e. a volume of the order of 35 l, making it possible to obtain the first emulsion 57 of droplets 58 of broken sludge.

This emulsion of drops in a strong upward stream of pressurized air subsequently enters a cylindrical pipe 59, extending the tank 56, having a smaller diameter d$_2$<d$_1$, for example with a diameter of 10 cm, and which extends over a length $\underline{h_2}$, for example of 1 m (with L$_1$=h$_1$+h$_2$).

In this air column, the gas stream carries out stripping of the gases present and/or resulting from the sludges and in particular of the ammonia NH$_3$, producing, in a way which is surprising and which depends on the operating conditions and on the organic sludges treated, virtually complete removal of the undesirable gases (<a few ppm) trapped in the sludges.

The length l$_2$ is advantageously proportioned by a person skilled in the art in order to do this.

A control valve 61 and/or a non-control valve is provided at the top 60 of the chamber for discharging to a tubular chamber 62.

The pressure of the emulsion 57 changes from P$_1$" (for example 3 bar) in the initial tank 56 to P$_2$" (2.890 bar), slightly less than P$_1$, in the top part of the column 59 of the container, at the level of the valve 61, with ΔP"=P$_2$"−P$_1$"=a few millibar, and then, at the outlet of the valve, to P$_3$"=2 bar (as a result of the pressure drop of the valve).

More specifically, the chamber 62 comprises a first section 63 having a length l$_3$, for example 5 m, which terminates in a venturi 64 which causes the pressure P$_3$'"<P$_3$" at the end 65 of the first section to change to a pressure P$_4$" in a second section 66 of the chamber as gravity gradient, provided with a vent 67, the section 66 having a length l$_4$, for example 1 m, with L$_2$=l$_3$+l$_4$.

The section 66 is connected to the filter 68 for separation of the suspended matter 69 from the liquid part 70, which is continuously emptied at 71, in a way known per se.

According to the invention, the chamber comprises means for feeding with flocculant 73 from a tank 74 for preparing by mixing and blending. A metering pump 75 introduces the flocculant into the sludge emulsion which exits from the container 52 at the outlet of the valve 61 or in the immediate proximity (i.e., a few cm) in a region 76 which is rather disturbed as a result of the pressure drop generated by the said valve 61. P$_3$" has here and for example changed from P$_2$"≈2 bar to P$_3$"=1.4 bar, P$_4$" for its part being at atmospheric pressure or substantially at atmospheric pressure as a result of the vent 67.

In this embodiment, an input of additional air 77, for example injected with the flocculant via the branch connection 78 or in parallel, has also been provided.

The emulsion 79 at the outlet of the treatment with the flocculant becomes an emulsion of air in the thickened flocculated sludge.

The two sections 63 and 66 are, for example, cylindrical with the same diameter $d_3$, for example equal to the mean diameter of the container, for example $$\frac{d1+d2}{2}.$$

For 10 m³/h of liquid sludge, with an air stream of 60 Sm³/h minimum, this being the case whatever the method of injection, and the container exhibiting a cross section of 200 mm for a height of 5 m, 10 m, 30 m or more, a very strong stripping effect (on the trapped gases) is observed, the air being intimately mixed with the sludge.

As regards the flocculant, use will preferably be made of a polymer, for example a cationic polymer.

For example, for a sludge comprising 7 g/l of SM, use is made of 50 g of crude polymer, for example prepared at 5 g/l, i.e. an injection of 10 l of solution per m³ of sludge. The injection is carried out on immediately exiting from the column of the container.

In an alternative form, it is possible to add a reactant which improves the impacts between the sludge particles. It can, for example, be used at a level of 10%, 5% or 1% of the SM content of the sludges, as seen above.

This reactant is, for example, sand, calcium carbonate, slaked lime, and the like. It is introduced upstream of the column, for example within a vessel for mixing with the liquid sludge (not represented).

Oxidation reactants can also be introduced.

In some applications, for example when the sludges comprise a great deal of organic fatty acids or when these sludges are sludges resulting from a biogas plant, excellent results are specifically observed.

For example, in proportions of 1 l of $H_2O_2$ or 1 l of $S_2O_8$ per 1 m³ of sludge comprising 40 g/l of SM.

There may also be a contribution of reactant for helping in the coagulation of the additional organic matter.

For example, for a sludge of 11 g/l of SM and 8% of VM (Volatile Matter, i.e. organic matter/dry matter) (approximately organic matter/dry matter (?)) and for 500 ml of sludge, 1 ml of $FeCl_3$ (10% solution) is introduced, either at the introduction of the liquid into the column or before the introduction of flocculant (after the column).

By way of example, tests were carried out on a biological sludge with a belt filter, starting from sludges with an SM content of 26 to 30 g/l, with:
Q'=50 to 80 Sm³/h
P=1.7 bar of pressure of the container/reactor
Q=3 to 15 m³/h.

On exiting from the process, sludges are obtained having a dry porous appearance, with an accelerated drying and a dryness at 25% to 35%.

It is thus observed that, surprisingly and by simple separation by settling, the water allows its nonbonded water to be directly discharged by gravity.

The sludge then gradually dries up, changing from 100 g/l of SM after the 1$^{st}$ hour to 130 g/l after 2 h, 160 g/l after 5 h and 350 g/l after 1 month (big bag).

Other examples of treatment according to the process employed, by recovery on sludge bins or big bags, give:
Sludge bin; Ex. 2: 130 g/l after 20 h and 180 g/l after 8 d.
Sludge bin; Ex. 3: 100 g/l after 5 h, 130 g/l after 7 d.
Big bag; Ex. 4: 100 g/l after 24 h, 115 g/l after 7 d and 221 g/l after 1 month.
Big bag; Ex. 5: 144 g/l after 24 h, 154 g/l after 7 d and 459 g/l after 1 month.
Big bag; Ex. 4: 120 g/l after 24 h (while it rained all night) and 402 g/l after 1 month.

It should be noted that the sludge treated according to the invention is liquid at the start.

Dilution is not a priori required up to 30 g/l. However, if the sludge is denser, for example above 40 g/l, diluting can be carried out at the inlet of the device in order to make possible satisfactory operation of the pumping of the sludge, which it should be remembered is an organic sludge, that is to say for which the OM (Organic Matter) content with regard to the SM (Suspended Matter) content lies between 65% and 85%. Organic Matter is understood to mean essentially phospholipids, polysaccharides, proteins, alkali metals, alkaline earth metals and/or metals, and the like.

Another operating example has been given below, this time with reference to simplified FIG. 2 (the first chamber portion is dispensed with).

The container 33 forms a first compartment in the form of a pipe with a diameter of 20 cm and a length of 50 cm, into which an organic sludge (resulting from a municipal treatment plant clarification basin) comprising 6 g/l of SM is introduced at the flow rate Q=10 m³/h and compressed air at 50 Sm³/h of air at 1.9 bar is introduced by virtue of a blower.

A 5 cm² orifice closes this compartment over a length of 10 cm.

A flocculant, for example in a proportion of 10 g/l, is introduced into the chamber 43 immediately downstream of the orifice.

The postorifice pressure gradually falls to arrive at atmospheric pressure after a few meters.

For example: the chamber 43 which forms a postorifice compartment is also a pipe with a length of 3 m and a diameter of 20 cm.

At the end of the chamber, all the streams join, for example, a filter bag (filter 50) with a cutoff threshold of 500 μm immediately giving a dryness of 10% (or 100 g/l) and a clear filtrate at 49 of 50 mg of oxygen ($O_2$) per liter (COD).

The reactants are introduced in liquid form via metering pumps. Conventionally, the more concentrated the sludges, the more dilute the reactants have to be prepared.

Exiting from the device is carried out at atmospheric pressure. However, bringing to atmospheric pressure can optionally be regulated in one embodiment of the invention, so as to recover the pressure of the downstream separation appliance.

The downstream appliances are conventional. It is found that their effectiveness with regard to dewatering is improved by at least 3%; for example, for a centrifuge which gives a result of 23% dryness, i.e. 230 g/l of SM, the device placed upstream makes it possible to achieve, in the end, a minimum of 26% dryness, i.e. 260 g/l of SM.

The appliances which can be used downstream are:
Filter bags (100, 300, 500 μm or more), open or closed
Floats
Mechanical thickeners
Screw presses
Belt filters
Centrifuges
Filter presses.

At the outlet, the sludges can very obviously be used in spreading over the soil, without or after composting, alone or with green wastes or other wastes.

They can also be dried on simple or solar drying beds.

It is noticed that, curiously, the sludges obtained are "non-odourous" and do not ferment over time (anaerobic fermentation).

In fact, the enormous dilution with the air allows the sludges to have a high dewatering power due to the presence of the air bubbles.

The results obtained with the device 1 according to the invention, combined downstream with appliances indicated, at different sludge flow rates, have been produced below in Tables I, II and III.

TABLE I

Device + belt filter

| Test | Sludge dryness device inlet | Sludge flow rate m³/h | Air flow rate Sm³/h | Pressure P Bar | Dryness Filter outlet | Comments | Length $L_2$ |
|---|---|---|---|---|---|---|---|
| 2 | 10 | 7.8 | 80 | 1.7 | 14 | Diluted sludge | 6 m |
| 3 | 10 | 7.8 | 95 | 1.2 | 16.5 | Diluted sludge | 3 m |

TABLE II

Device 1 + big bag

| Test | Test type | Test date | Immediate dryness | Dryness at 1 d | At 1 month |
|---|---|---|---|---|---|
| T0 | Control without device solely filtering big bag | 05/04 | 8% | 10% | 22% |
| TESTS 10 DAYS | Device + filtering big bag Flow rate of 3 to 12 m³/h | Mid-April | 10% to 11% | 14.5% to 15.5% | 45.9% to 53.5% |

It is observed that, by virtue of an optimized concentration of the sludges obtained with the invention, for example from 70 to 130 g/l of SM, the latter will very favourably maximize the function of dewatering by appliances such as centrifuges or a filter press, making it possible to considerably improve the output of these. This is because, as the nonbonded water has been extracted by the process described above, this makes it possible to improve virtually systematically, by at least 100 g/l, the SM content of the sludges at the outlet.

As is obvious and as also results from the above, the present invention is not limited to the embodiments more particularly described. On the contrary, it embraces all the alternative forms thereof and in particular those where the number of chamber portions and/or sections is different, for example greater than three, or also where the container is horizontal with just one section.

The invention claimed is:

1. A process for the treatment of an organic sludge, in which the said sludge is fed as a continuous stream at a flow rate q (m³/h), either directly or via a first chamber maintained at a predetermined first pressure (P1) to a second chamber maintained at a predetermined second mean pressure ($P_2$, P', $P_1$", $P_2$") by injecting air into the said second chamber at a flow rate Q (Sm³/h), in order to obtain in the said second chamber a first emulsion, forming a dispersed phase of sludge in a continuous phase of air which surrounds it, a predetermined pressure drop is created in the said first emulsion by causing it to pass, via one or two restrictions or via a feed valve, into a third chamber maintained at a predetermined third pressure ($P_4$, $P_2$', $P_3$") in the region located immediately downstream of the said restriction(s) or of the said valve,
a flocculant is injected into the said region of the third chamber in order to form at the outlet of the treatment a second emulsion of air in the thickened flocculated sludge, then the said second emulsion is degassed to atmospheric pressure before discharge,
the said second emulsion is recovered in a device for filtration or for separation by settling, and it is filtered or separated by settling.

2. The process according to claim 1, wherein the second chamber is fed with sludge through a restriction termed first restriction, the predetermined pressure drop in the emulsion being created by a second restriction and a third restriction or else by a valve.

3. The process according to claim 1, wherein the first chamber has a volume of less than 3200 cm³, the first pressure ($P_1$) being between 4 and 10 bar absolute, and in that the flow rate q is between 5 m³/h and 30 m³/h, the second pressure ($P_2$; P'; $P_1$", $P_2$") is between 1.2 bar and 4 bar absolute, the air flow rate Q being between 5 Sm³/h and 200 Sm³/h, and the third pressure ($P_4$; $P_2$'; $P_3$") is between 1.05 bar and 2 bar absolute.

4. The process according claim 1, wherein an intermediate chamber between the second and third chambers is fed with emulsion.

5. The process according to claim 4, wherein air is a second time injected downstream of the first injection into the intermediate chamber located between the second chamber and the third chamber, at a flow rate Q'.

6. The process according to claim 1, wherein the first, second and/or third restrictions are formed by venturis.

7. The process according to claim 1, wherein the second chamber is a column with a mean diameter d and with a height H≥10 d.

8. The process according to claim 1, wherein the flocculant is a polymer injected on immediately exiting the said restriction or restrictions or the valve.

9. The process according to claim 1, wherein a portion of the flocculated emulsion is recycled in the first chamber.

10. A device for the continuous treatment of an organic sludge comprising
means for feeding with the said sludge as a continuous stream at a flow rate q, either directly or via a first chamber maintainable at a first pressure (P1), of a second chamber maintainable at a predetermined second mean pressure ($P_2$, P', $P_1$", $P_2$");
the said second chamber;
means for injecting air into the said second chamber at a flow rate Q, in order to obtain a first emulsion, forming a dispersed phase of sludge in a continuous phase of air which surrounds it in the said second chamber,
a restriction or a valve arranged in order to create a predetermined pressure drop in the said first emulsion,
a third chamber maintainable at a predetermined third pressure ($P_3$, $P_2$', $P_3$") in the region located immediately downstream of the said restriction or valve,
means for injecting a flocculant into the said region of the third chamber, in order to form a second emulsion of air in the thickened flocculated sludge,
means for degassing the said second emulsion to atmospheric pressure,
means for recovering the said second thus degassed emulsion in a device for filtration or for separation by settling and
the said device for filtration or for separation by settling.

11. The device according to claim 10, wherein the feeding means comprise a first restriction for introduction into the second chamber, the pressure drop in the emulsion being created by a second restriction and a third restriction or a valve.

12. The device according to claim 10, wherein the degassing means are located at the other end of the third chamber relative to the region located immediately downstream of the restriction or valve arranged in order to create a predetermined pressure drop in the emulsion.

13. The device according to claim 10, wherein it additionally comprises an intermediate chamber between the second and third chambers and means for injecting air downstream of the first injection into the said intermediate chamber.

14. The device according to claim 10, wherein the first, second and/or third restrictions are formed by venturis.

15. The device according to claim 10, wherein the second chamber is a column with a mean diameter d and with a height $H \geq 10$ d.

* * * * *